United States Patent [19]

Edvardsson

[11] Patent Number: 4,641,139
[45] Date of Patent: Feb. 3, 1987

[54] METHOD AND APPARATUS FOR MEASURING THE LEVEL OF A FLUENT MATERIAL IN A CONTAINER

[75] Inventor: Kurt O. Edvardsson, Linköping, Sweden

[73] Assignee: Saab Marine Electronics Aktiebolag, Goteborg, Sweden

[21] Appl. No.: 725,621

[22] Filed: Apr. 22, 1985

[30] Foreign Application Priority Data

Apr. 25, 1984 [SE] Sweden .................................. 8402247

[51] Int. Cl.⁴ ............................................. G01S 13/08
[52] U.S. Cl. .................................. 342/124; 73/290 R
[58] Field of Search .............. 343/12 R, 14; 73/290 R

[56] References Cited

U.S. PATENT DOCUMENTS

| | | | |
|---|---|---|---|
| 4,359,902 | 11/1982 | Lawless | 343/14 X |
| 4,489,601 | 12/1984 | Rao et al. | 73/290 R |
| 4,503,433 | 3/1985 | Tomasi | 343/12 R X |
| 4,566,321 | 1/1986 | Zacchio | 343/12 R X |

Primary Examiner—T. H. Tubbesing
Attorney, Agent, or Firm—James E. Nilles; James R. Custin

[57] ABSTRACT

In a method of measuring the level of a flowing material kept in a container there is employed a microwave signal that is fed from a transmitter through a tubular waveguide (7) that extends vertically downwardly through the container and communicates therewith so that the surface (10) of the material in the waveguide follows the level of the surrounding material. The signal is reflected from the surface back up through the waveguide and is conducted to a receiver to be employed, after signal processing in an electronic unit, for determining the level of material in the container. The microwave signal is fed to the waveguide by way of a mode generator (11) that produces only one dominant propagation mode of the signal, the wavelength of which is smaller than the diameter of the waveguide (7).

10 Claims, 5 Drawing Figures

METHOD AND APPARATUS FOR MEASURING THE LEVEL OF A FLUENT MATERIAL IN A CONTAINER

This invention relates to a method for measuring the level of a fluent material stored in a container by means of a microwave signal which is fed out of a transmitter through a tubular waveguide that extends vertically downwardly through the container and so communicates with it that the surface of the material in the waveguide follows the level of the surrounding material, and which signal is reflected by the surface back up through the waveguide and is conducted to a receiver, to be employed, after signal processing in an electronic unit, for determining the level of material in the container. The invention also relates to apparatus for practicing this method.

Radar can be employed for measuring the level of a liquid or liquid-like material that is contained in a cistern, tank or the like, as described for example in U.S. Pat. No. 4,044,355. Because the velocity of radar waves in air or other gases is very stable, a good accuracy is obtained, and because the radar antenna can be made of very durable material, such a level measurer can be employed in environments that are very extreme with respect to temperature, chemical corrosion and mechanical stress. Since the radar antenna can be mounted in a hole in the top of the tank, its installation becomes simple and it also becomes simple to perform maintenance and eventual replacement.

It has heretofore been a limitation on its employment that a radar beam requires a certain space among the existing struts, ladders, pipes, etc. in the tank. If a round radar antenna with a diameter D is employed, the usable width of the radar beam becomes about $\lambda/D$ radians but the undisturbed zone, taking into consideration the diffuse boundaries of the radar beam, must be a cone with a top angle of about $2\lambda/D$ radians. Here, $\lambda$ designates the wavelength of the radar carrier wave, which can be, for example, 3 cm. On the basis of various practical considerations the antenna diameter must be held within certain limits and the wavelength of the carrier wave is in practice limited downwardly inasmuch as the radar transmitter and other components become expensive and critical in various respects with very high carrier frequency. Thus the radar beam cannot be arbitrarily narrow, and in several applications this is not at all desirable, for example when the apparatus is employed in a tanker ship with varying trim and list. In a practical case an angle of 5°–15° can be mentioned as a typical space requirement, and this means that many tanks do not allow a radar level measurer with free space propagation to be installed. This applies no less to cisterns or tanks with so-called floating roofs, that is to say, tanks with roofs that float directly upon the contents.

A method for avoiding the above mentioned limitation is to guide the radar waves in a waveguide that extends downwardly through the tank. Level measuring according to this method has heretofore been tried (see for example U.S. Pat. No. 4,359,902) but has great practical limitations owing to the fact that a normal waveguide has a relatively small diameter, in order to be suitable for the radar frequency range to be employed. The waveguides that are referred to have comprised rectangular or circular cylindrical pipes of metal with dimensions that allow one-mode propagation. For a circular waveguide this implies that the wavelength $\lambda$ should be between 1.3 and 1.7 times the inside diameter of the pipe, and for typical radar frequencies the pipe diameter thus has a magnitude on the order of only a few centimeters.

Such a waveguide presents these problems:

If the tank contents is crude oil rich in wax, the pipe becomes clogged.

The propagation of the radar waves is unacceptably influenced by the hole in the tubular waveguide that is needed for assuring free flow of liquid between the outside and the inside.

Corrosion in the pipe causes unacceptable damping in transmission from top to bottom with normally occurring tank heights. It therefore becomes necessary to make the pipe of expensive material or to coat its inside with noble metal.

The speed of propagation is powerfully influenced by the pipe dimension and the radar frequency and a good accuracy therefore imposes a very strong requirement for these magnitudes to be constant or accurately known.

The present invention proceeds from the realization that these problems can be solved by employing a powerfully over-dimensioned waveguide to which radar radiation is so conducted that all undesired waveguide modes are suppressed. The waveguide, in the majority of practical cases, can be assumed to consist of an existing pipe in the cistern or tank, which means that a useful construction must be able to tolerate substantial variations of the dimensions of the pipe from case to case. It is also necessary that a reasonable mass of rust and oil coating be acceptable.

A pair of calculations of practical cases can illustrate the significance of employing the overdimensioned circular waveguide. If the distance is measured through the waveguide, there is obtained an apparent distance $L_s$ that is greater than the real distance $L$, and the quotient can be expressed by the formula $$L_s = \frac{L}{\sqrt{1 - \left(\frac{\lambda}{\lambda_c}\right)^2}}$$

where $\lambda$ can, as above, be set equal to 3 cm. and $\lambda_c$ is the limit wavelength (cutoff wavelength) of the waveguide, which for the basic mode is 1.71 times the diameter of the pipe. From the formula it can be seen that if $\lambda_c$ is large compared with $\lambda$ (that is, if the pipe has a diameter that is large compared with wavelength $\lambda$) there is obtained a measurement value $L_s$ that is near the real $L$. If, on the contrary, the waveguide has one-mode propagation, $\lambda$ is 75–100% of $\lambda_c$, and $L_s$ becomes substantially larger than $L$. If now the carrier frequency and with it $\lambda$ is changed, the quotient $L_s/L$ will be changed, and if the changes are small the relative change of $L_s/L$ becomes proportional to the relative change of $\lambda$ or $\lambda_c$ and the proportionality constant, after derivation and simplifying, can be given as $$\frac{\left(\frac{\lambda}{\lambda_c}\right)^2}{\left[1 - \left(\frac{\lambda}{\lambda_c}\right)^2\right]^{3/2}}.$$

For a normal waveguide with one-mode propagation the factor is typically ⅔. For measuring with crude oil there is required a measuring accuracy of about $10^{-4}$ which means a maximum error of 2 mm in a 20 m distance, and the same accuracy would then be required of the pipe diameter and frequency, which is not practically possible. If, instead, one employs a pipe with for example a 25 cm diameter and a wavelength of 3 cm., the factor sinks to 5/1000. There is thus obtained a relative accuracy of $10^{-4}$, provided that the accuracy of diameter and of frequency are on the order of one percent, which is reasonable.

Damping in a waveguide depends upon the resistive loss in the walls, and the calculation thereof is found in several handbooks about waveguides, for example Marcuvicz: "Waveguide Handbook," McGraw Hill, 1951. For a one-mode waveguide of copper, the diameter of which is about 2 cm, with $\lambda=3$ cm., the damping through a 25 m long waveguide forwardly and rearwardly is about 10 dB. If stainless steel is employed the damping becomes about 10 times higher (about 100 dB), which is too much to permit accurate level measuring.

If signals of the same wavelength are instead led through a pipe with for example a diameter of 25 cm, the damping becomes 40 times lower, and even with a steel pipe the damping then stands at 2.5 dB. In practice the damping will become larger by reason of an oil deposit on the inside of the pipe, but the low damping in the ideal case allows a sufficient margin for deterioration in operation.

The reason for the damping decreasing when the pipe diameter is increased is, as is known, that the surface current on the walls decreases, with a similarly large transferred power in the waveguide. For the same reason, therefore, significantly more holes can be tolerated in the envelope surface of a very large pipe than would be permitted in a waveguide with normal diameter.

In prior reasoning it has been accepted to employ the basic mode of the waveguide, that is, $H_{11}$ according to the designation system in the above mentioned handbook. To improve tolerance to the influence of rusty walls, holes and the like, it would however be preferable to employ the $H_{01}$ propagation mode, which yields a significantly lower current in the walls of the waveguide and thereby lower losses. In addition to the low losses, an important characteristic of the $H_{01}$ mode is that all current in the wall of the pipe flows in the peripheral direction, so that disturbances from existing pipe joints are insignificant.

For obtaining an accurate distance measurement in a pipe in accordance with the present inventive idea, it is necessary that all undesired propagation modes be suppressed. If that is not the case, a normal echo will be interpreted as plural echoes from different distances, because the different propagation modes in general have different speeds in the pipe. A typical demand upon power overweight for the desired mode can be 25 dB, and this presents a large demand upon the measurement apparatus in the upper end of the pipe.

The demand is in part that the emission power in the undesired modes be sufficiently low, in part that the sensitivity for incoming power in undesired modes be sufficiently low. This latter demand must be posed to avoid having the power reach the receiver that is spread to undesired modes by way of holes in the pipe walls.

The object of the present invention is to provide a method and apparatus for accurately determining with radar the level of a liquid or other fluent material that is held in a container. In this the invention especially aims to solve the above discussed problems that arise when a pipe extending through the container is to be employed as a waveguide. For application of the method to tanks or cisterns on land, comprising so-called floating roofs, it is in this respect a special objective to have a simple installation of radar apparatus that does not make necessary extensive and expensive remodeling of the tank or the cistern.

This objective is achieved according to the invention because the method and apparatus have the characteristics set forth in the patent claims below.

The invention will now be described in detail with reference to the accompanying drawings, which show an exemplary embodiment and in which.

Figure 1:
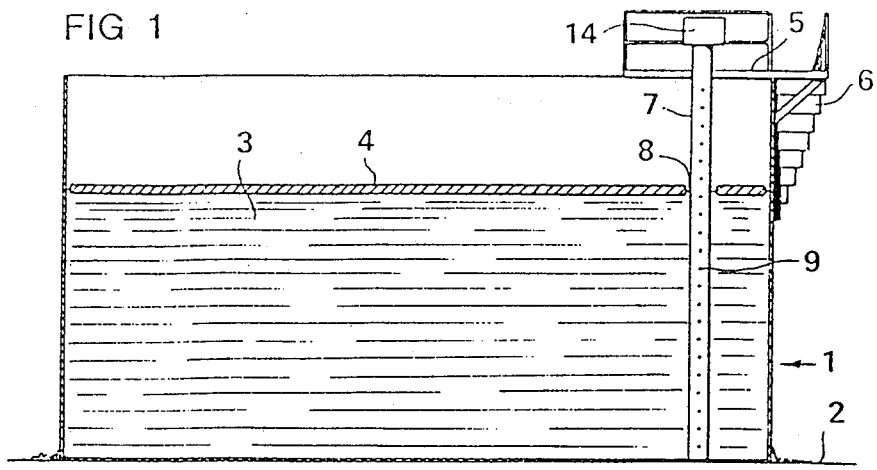
FIG. 1 is a vertical section of an oil cistern of a type that provides an important application for the invention.

The application of the invention that is illustrated in FIG. 1 is for carrying out level measuring in a cistern 1 that can be built up on a foundation on the ground 2 and wherein there can be stored a large quantity of oil or other fluent material 3 which, while in storage, is protected by a so-called floating roof 4. Such a cistern can be very large, with a diameter on the order of 100 m; and because every millimeter of height represents a substantial volume and a large economic worth, it is required that the level of material shall be measured exactly, for determining the contents of the tank as correctly as possible.

At the top of the cistern there is a platform 5 to which leads a stairs 6 and to which is fixed the upper end of a pipe 7 provided for level measuring. Through an opening 8 in the floating roof 4 the pipe 7 extends vertically downward to the bottom of the cistern, where it is fixed. Along the whole of its length the pipe is perforated with sufficiently large and closely spaced holes 9 so that the interior of the pipe is communicated outwardly and the liquid surface 10 in the pipe can follow the level of the surrounding liquid, that is, the underside of the roof 4, see FIG. 2. A similar pipe in existing tanks was originally intended for housing a float belonging to a mechanical measuring device and its diameter is therefore usually as opportunely large as 20 to 30 cm.

It will be appreciated that it is of great value if, in converting to a radar measuring system with such a storage structure, the installation can be based upon the existing cistern construction and, with this, also continue to employ the large pipe that had been provided for float measuring. A remodeling of an oil cistern of the size here suggested with a view to instead base a radar measuring system upon a free antenna radiation would involve such large costs and be so hard to carry out, especially if the cistern had a floating roof, that it would not be a realistic alternative.

The solution that the invention contemplates to the problem of providing a measuring system that can be installed in cisterns so that they can maintain a performance as set forth above principally involves employing the cistern pipe 7 as a waveguide and feeding it with a microwave signal by a mode generator generally designated by 11, which is applied to the pipe and is arranged to produce only one dominant mode of propagation of the signal.

In the illustrated example the mode generator 11 comprises a cylindrical waveguide 12 which is coupled by means of a coaxial conductor 13 to a transmitter (not shown) that is included in an electronic unit which is suitably mounted in a housing 14 above the platform 5. The waveguide 12 should have such a diameter in relation to the wavelength of the supplied signal that only modes $H_{11}$ and $E_{01}$ can be transmitted, and with the help of symmetry it can be brought about that only the latter mode will be found in the signal. The waveguide passes over into a downwardly directed primary radiator 15 which can be formed as an antenna horn and which produces an antenna radiation with for example a 60° lobe width and a field image of $E_{01}$ character so that the electrical field is radially directed.

Figure 3:
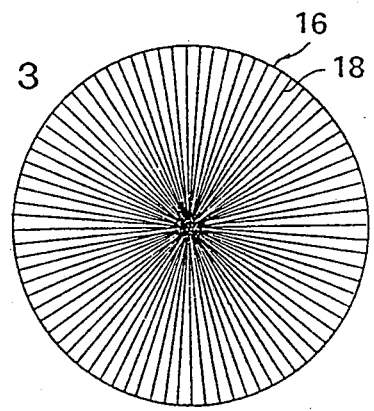
FIG. 3 is a top view of a mode filter comprising a part of the apparatus of FIG. 2.

The mode generator in the illustrated example is of the double reflector type and here comprises two reflectors 16, 17 disposed one after the other in the direction of radiation. The first mentioned, which can be planar or parabolic, consists of a dielectric shell, for example of plastic, which on one side—preferably its upper side—is provided as shown in FIG. 3 with a system of radially extending conductors 18, preferably produced as a printed pattern of leads. The mutual distance between the conductors should be so small that the $E_{01}$ mode emitted from the antenna horn 15 is reflected, in the main, just as well as in a continuous metal surface.

Figure 2:
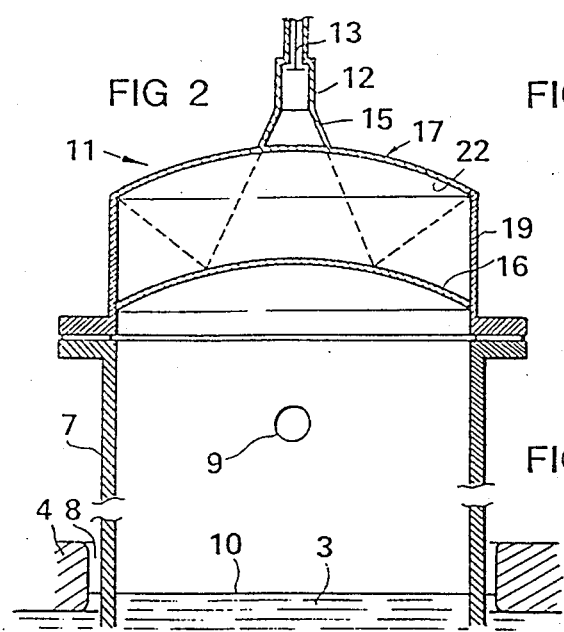
FIG. 2 shows a vertical section through a mode generator according to the invention and the upper portion of a pipe used as a waveguide extending into the cistern in FIG. 1.
Figure 5:
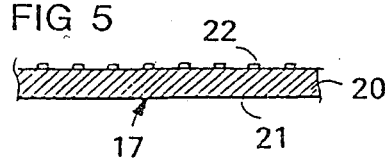
FIG. 5 is a view in section taken along the line V—V in FIG. 4.

The second reflector 17, which in the example is supported by a metal pipe 19 that constitutes an upward elongation of the cistern pipe 7, should have a parabolic or similar form so that the radar beam, which propagates upward from the reflector 16 in diverging directions, will at a second reflection become plane-parallel and directed vertically downward in the pipe 19. The reflector 17 can also comprise a plastic plate 20, which is metallized on the portion of its upper side that is radially outward of the horn 15, so that the whole of this portion of the plate 20 is covered by a metal film 21 (see the cross-section in FIG. 5). On the underside of the plastic plate 20, except for its central portion corresponding to the diameter of the horn, there is a printed conductor pattern consisting of spiral-form leads 22 that can be as closely spaced as the radial leads 18 on the lower reflector 16. The lead pattern together with the thickness of the plate (about 0.25 $\lambda$ in the actual dielectric) has the characteristic that an electromagnetic wave that has its E-vector perpendicular to the spirals is reflected with 180° lag compared with a wave that has the E-vector parallel with the spirals. The spiral form of the leads is such that a tangent to each at every point on it forms an angle $\alpha = 45°$ to the radius from the center of the spiral pattern through the same point; hence, the ultimate result is that the $E_{01}$ mode, by reflection downward, is transformed to an $H_{01}$ mode, that is to say the electrical field now takes a peripheral direction. Other, undesired modes of the radiation are at the same time reflected away. The reflector 17 can be combined with the primary radiator 15, as shown in FIG. 2.

The $H_{01}$ mode so produced by the mode generator in propagating downward will go through the lower reflector 16, and since the field of the $H_{01}$ mode has the above mentioned direction the signal is not significantly influenced when it passes the leads 18 that extend perpendicular to the field and the shell that supports them. The microwave signal thereafter continues downward through the cistern pipe 7 to be reflected by the liquid surface when it meets the same and be returned to the antenna 15 and the coaxial cable 13. The echo signal is conducted by the cable to a receiver in the electronic unit 14, where there takes place in a conventional manner a mixing of the transmitted and received signals, whereupon a determination of the material level takes place based upon the travel time, that is, the distance to the surface 10.

During the upward travel of the echo signal through the pipe 7, by reason of the hole 9, a part of its power will be converted to propagation modes other than the dominant $H_{01}$ mode, and these will be returned in part to the lower reflector 16. The radial grating 18 on this will however prevent these false echoes from propagating farther and reaching the interior of the antenna 15. The reflector thus functions in this respect as a mode filter.

Figure 4:
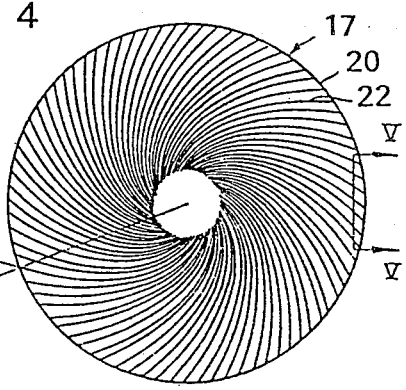
FIG. 4 is a bottom view of a reflector also comprising a part of the apparatus of FIG. 2.

The invention is not limited to the embodiment here shown and described. In an alternative embodiment the reflector 17 can comprise a metallic surface with corrugations in the form of a spiral pattern as described above. In another embodiment the mode generator can comprise, instead of the reflectors 16 and 17, a transmitting plate, both sides of which have a spiral pattern like that of FIG. 4, whereby the $E_{01}$ mode signals coming from above it are transformed to $H_{01}$, which thus becomes the dominant mode. For parallelization of the radiation beam from the plate a lens with the same diameter as the pipe 7 can be employed.

A measuring system according to the illustrated or modified construction is preferred when the invention is applied to large tanks or cisterns where there can be employed as a waveguide an existing pipe with a diameter of 0.2–0.5 m. In a smaller pipe it is possible to employ as a mode generator a conventional $H_{01}$–$H_{11}$ transition, for example a Marie transition, in combination with a conical diameter adaptation, but because of the requirement for mode suppression such a combination becomes very long (many meters) for many practical cases that are of interest. A certain improvement can be obtained with a non-conical funnel such as is shown in "State of the Waveguide Art" in Microwave Journal, December, 1982. In certain cases a funnel can offer a practical solution in combination with $H_{01}$ as the dominant propagation mode, provided that the funnel can be hung down in the pipe. The length is then a lesser disadvantage, and through the special characteristics of the $H_{01}$ mode the requirement for matching form between the pipe and the funnel becomes moderate.

I claim:

1. Method of measuring the level of a fluent material in a container (1), with the use of a microwave signal that is fed through a tubular waveguide (7) that extends vertically downward through the container and communicates with it so that the surface (10) of the material in the waveguide follows the level of the surrounding material, and which signal is reflected by the surface back up through the waveguide to be received and employed, after signal processing, for determining the level of material in the container, characterized in that the microwave signal has a wavelength substantially smaller than the diameter of the waveguide (7), and that the microwave signal is fed to the waveguide by way of a mode generator (11) that produces substantially only one dominant propagation mode of the signal.

2. Method according to claim 1, characterized in that a rotationally symmetrical propagation mode is fed out of the mode generator (11).

3. Apparatus for measuring the level of a fluent material in a container (1), comprising a tubular waveguide (7) that extends vertically downward through the container and is so communicated with it that said material has a surface in the waveguide which reflects microwave signals and which follows the level of the surrounding material in the container, and transmitting and receiving means (14) for generating a microwave signal, feeding it downward through said tubular waveguide and receiving it as reflected from said surface, said transmitting and receiving means cmprising an electronic unit for employing the received signal to determine the level of the material in the container, said apparatus being characterized by: said waveguide (7) having a diameter several times greater than the wavelength of said signal; and a mode generator (11) between said transmitting and receiving means (14) and said waveguide (7) that is arranged to produce substantially only one dominant propagation mode of the signal.

4. Apparatus according to claim 3, wherein said one dominant mode of the signal is the $H_{01}$ mode and the waveguide (7) has a circular cross-section, characterized in that the mode generator (11) comprises a primary radiator (15) that is connected to the transmitter and is arranged to transform the microwave signal to a signal of the $E_{01}$ type, and a mode converter (17) that converts the transformed signal to a signal of the $H_{01}$ type which is fed through the waveguide (7).

5. Apparatus according to claim 4, characterized in that the mode converter (17) is a downwardly directed reflector (17) which is so arranged as to reflect the signal to plane-parallel form.

6. Apparatus according to claim 5, characterized in that the downwardly directed reflector (17) is parabolic and comprises a dielectric plate (20) the upper side (21) of which is electrically conductive and the under side of which has a pattern of conductors comprising spirally curving leads (22).

7. Apparatus according to claim 6, characterized in that said downwardly directed reflector (17) has a center substantially on the axis of said waveguide (7), and the tangent to each of said spirally curving leads (22), at every point on the same, forms an angle ($\alpha$) of approximately 45° with the radius from said center that extends through the same point.

8. Apparatus according to claim 7, characterized by a filter (16) that is disposed between the receiver and a portion of the waveguide that is spaced above the bottom thereof, said filter (16) being arranged to filter out undesired modes that arise in the waveguide by reason of, for example, holes (9) in it.

9. Apparatus according to claim 8, characterized in that said filter (16) comprises an upwardly directed reflector that is placed between the waveguide (7) and the primary radiator (15) and is arranged to reflect said microwave signal of the $E_{01}$ type to the downwardly directed reflector (17) in such a manner that the microwave signal reflected by the latter is converted to a signal of the $H_{01}$ type and can pass unaffected through the upwardly directed reflector.

10. Apparatus according to claim 9, characterized in that the upwardly directed reflector (16) has a center substantially on the axis of said waveguide and has a lead pattern (18) consisting of conductors that extend radially in relation to said center.

* * * * *

REEXAMINATION CERTIFICATE (3485th)
United States Patent [19]
Edvardsson

[11] B1 4,641,139
[45] Certificate Issued  Apr. 14, 1998

[54] METHOD AND APPARATUS FOR MEASURING THE LEVEL OF A FLUENT MATERIAL IN A CONTAINER

[75] Inventor: Kurt O. Edvardsson, Linköping, Sweden

[73] Assignee: Saab Marine Electronics Aktiebolag, Goteborg, Sweden

Reexamination Request:
No. 90/004,617, May 1, 1997

Reexamination Certificate for:
Patent No.: 4,641,139
Issued: Feb. 3, 1987
Appl. No.: 725,621
Filed: Apr. 22, 1985

[30] Foreign Application Priority Data

Apr. 25, 1984  [SE]  Sweden ........................ 8402247

[51] Int. Cl.$^6$ ..................................... G01S 13/08
[52] U.S. Cl. ........................... 342/124; 73/290 R
[58] Field of Search ................ 342/22, 124; 73/290 R

[56] References Cited

U.S. PATENT DOCUMENTS 3,995,212  11/1976  Ross ............................ 324/642

OTHER PUBLICATIONS

Stuchley et al., "Microwave Surface Level Monitor," *IEEE Transactions on Industrial Electronics and Control Instrumentation*, 1971.

OIML, "Automatic Measurement of the Level of Liquid in Fixed Storage Tanks," Second Pre–draft International Recommendation of *International Organization of Legal Metrology*, 1983.

Draft International Recommendation of *Organisation Internationale de Metrologie Legale*, 1988.

Miller, "Waveguide as a Communication Medium", *The Bell System Technical Journal*, 1954.

Felsen et al., "Measurement of Two Mode Discontinuities in a MultiMode Wave Guide by a Resonance Technique," *IRE Transactions on Microwave Theory and Techniques*, 1959.

Boulanger et al., "Radio Frequency Techniques for Measuring Water Levels in Narrow Diameter Piezometers," *Journal of Microwave Power*, 1970.

Warters, "The Effects of Mode Filters on the Transmission Characteristics of Circular Electric Waves in a Circular Wave Guide," *The Bell System Technical Journal*, 1957.

Skolnik, *Radar Handbook*, chapter 8 by George P. Kefalas and James C. Wiltse "Transmission Lines, Components, and Devices," McGraw–Hill Book Company (1970). Pp. 8–8 and 8–9.

*Primary Examiner*—John B. Sotomayor

[57] ABSTRACT

In a method of measuring the level of a flowing material kept in a container there is employed a microwave signal that is fed from a transmitter through a tubular waveguide (7) that extends vertically downwardly through the container and communicates therewith so that the surface (10) of the material in the waveguide follows the level of the surrounding material. The signal is reflected from the surface back up through the waveguide and is conducted to a receiver to be employed, after signal processing in an electronic unit, for determining the level of material in the container. The microwave signal is fed to the waveguide by way of a mode generator (11) that produces only one dominant propagation mode of the signal, the wavelength of which is smaller than the diameter of the waveguide (7).

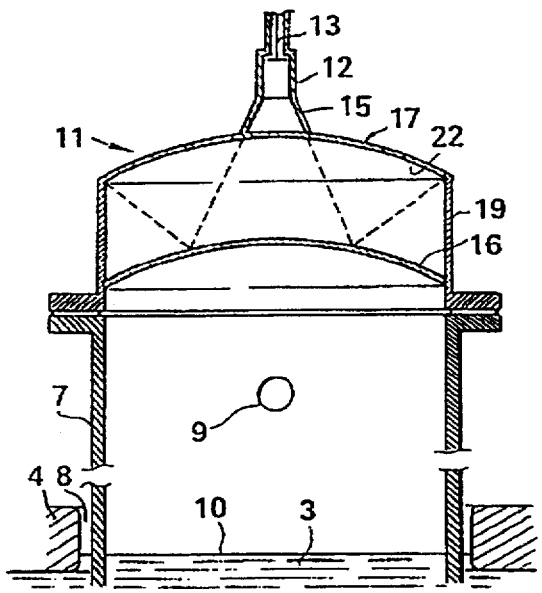

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *